G. E. RIGBY.
FRAME FOR CYCLES.
APPLICATION FILED MAY 24, 1917.
1,282,002.
Patented Oct. 15, 1918.
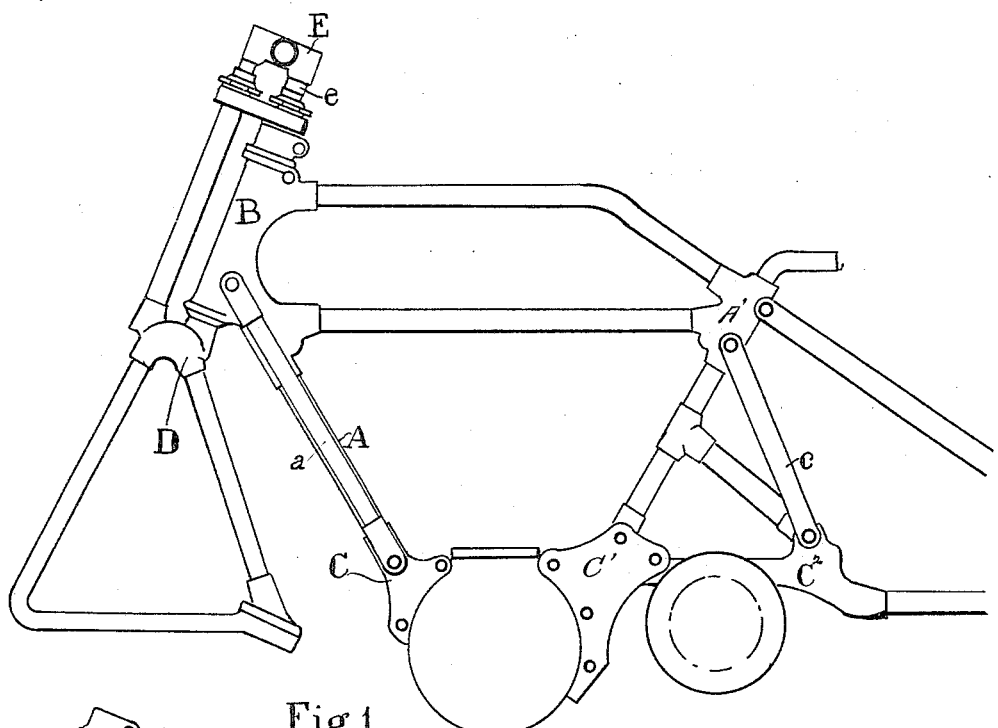
Fig. 1.
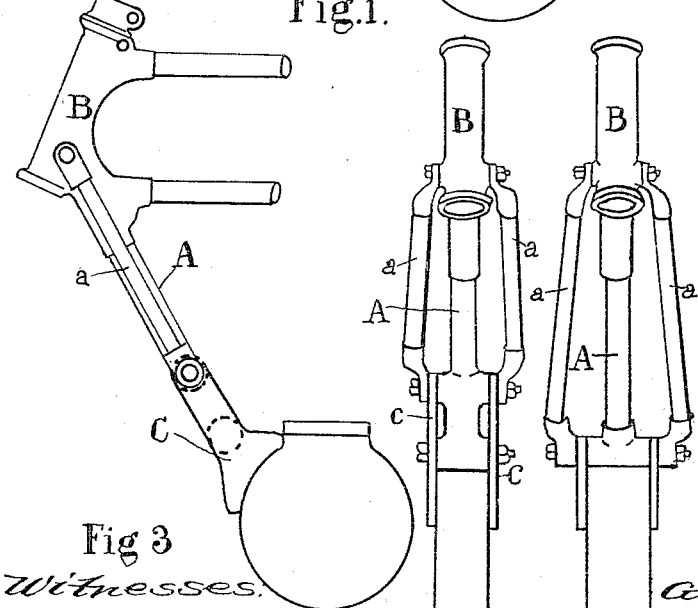
Fig 3.
Fig. 4.   Fig. 2.
Witnesses:
M. E. McHade
C. F. Kesler
Inventor
George E. Rigby
by James L. Norris
Attorney

UNITED STATES PATENT OFFICE.

GEORGE E. RIGBY, OF MANCHESTER, ENGLAND.

FRAME FOR CYCLES.

1,282,002.  Specification of Letters Patent.  Patented Oct. 15, 1918.

Application filed May 24, 1917. Serial No. 170,717.

*To all whom it may concern:*

Be it known that I, GEORGE EDWIN RIGBY, a British subject, residing at Manchester, county of Lancaster, England, have invented certain new and useful Improvements in Frames for Cycles, of which the following is a specification.

This invention relates to the frames of motor bicycles, which are subjected to torsional stresses and is designed with the object of strengthening such frames and rendering them less liable to fracture.

These frames are constructed of tubular members of varying thicknesses, brazed together at the joints, the members being of larger diameter where the greater stresses occur.

I find that any form of tension or compression stays are objectionable and that the frame may be strengthened in a much more satisfactory manner by the addition of auxiliary tubular members rigidly attached to the lugs or brackets of the frame by screws or brazing.

The invention consists essentially in the particular application to an ordinary type of motor cycle frame of auxiliary tubular members which extend upwardly from the engine lugs or gear bracket, alongside the existing or ordinary frame members, such auxiliary tubular members being rigidly attached by screws or brazing and free from either tension or compression.

The invention will be fully described with reference to the accompanying drawings.

Figure 1 is a side elevation of motor cycle frame.

Fig. 2 is a front elevation of same with front fork removed.

Figs. 3 and 4 is a side elevation and front elevation showing a modification.

The main frame of the cycle is of ordinary or known construction and according to the invention auxiliary tubular members *a c d* are rigidly attached thereto by screws or brazing to strengthen the frame.

A pair of auxiliary tubular members *a*—one at either side of the main frame member A (known as the front down tube)—are rigidly attached at one end to the steering head B and at the other end to the front engine lug *c* by screws or by lugs brazed thereto. A similar pair of auxiliary tubular members *c* are rigidly attached at one end to the seat lug A′ and at the other end to the back engine lug C′ or to the gear bracket C² by screws or brazing. Similar auxiliary tubular members may be rigidly attached alongside the top frame members being rigidly secured to the steering head B and to the seat lug A′ or other rear lug by screws or brazing.

The auxiliary tubular members may be rigidly attached to the steering head and to the engine bracket beneath the existing frame members, the engine bracket being shaped to receive it, or it may be rigidly attached to a strut projecting from the bracket to receive it or to the engine case. Similarly the additional tubular members may be placed above or below the top frame members.

Instead of being attached to brackets of existing construction additional brackets or lugs may be rigidly fitted at or near the steering head, at or near the seat pillar and at or near the engine brackets to which the auxiliary tubular members are rigidly attached.

I at present prefer to form a boss on each side of the steering head or steering head lug to which to attach one end of the auxiliary tubular member and a similar boss on each side of the engine lug or bracket to which to attach the other end of the auxiliary tubular member by set pins screwed into such bosses. Or studs may be cast or brazed in position to receive the ends of the auxiliary tubular members which will be secured thereto by nuts or brazed as desired.

What I claim as my invention and desire to protect by Letters Patent is:—

1. In a motor cycle, a frame structure including a steering head, engine lugs and a gear bracket, a front down tube, and a pair of additional auxiliary tubular members adjacent to and in the same plane as the front down tube and rigidly secured at their upper ends to a part of the frame structure and connected at their lower ends to one of the engine lugs.

2. In a motor cycle, a frame structure including a steering head and a seat lug, a front down tube, front and rear engine lugs and a gear bracket, a front pair of additional auxiliary tubular members adjacent to and in the same plane as the front down tube and rigidly secured at their upper ends to the steering head and at their lower ends to the front engine lug, and a rear pair of auxiliary tubular members secured at their upper ends to the seat lug and at their lower ends to the gear bracket.

In testimony whereof I have hereunto set my hand in presence of two subscribing witnesses.

GEO. E. RIGBY.

Witnesses:
J. OWDEN O'BRIEN,
GEO. H. O'BRIEN.

Copies of this patent may be obtained for five cents each, by addressing the "Commissioner of Patents, Washington, D. C."